(12) United States Patent
Mikamo et al.

(10) Patent No.: US 8,294,407 B2
(45) Date of Patent: Oct. 23, 2012

(54) MOTOR CONTROLLER AND ELECTRIC POWER STEERING SYSTEM

(75) Inventors: Satoru Mikamo, Okazaki (JP); Atsuo Sakai, Ozaka (JP)

(73) Assignee: JTEKT Corporation, Osaka (JP)

( * ) Notice: Subject to any disclaimer, the term of this patent is extended or adjusted under 35 U.S.C. 154(b) by 355 days.

(21) Appl. No.: 12/828,417

(22) Filed: Jul. 1, 2010

(65) Prior Publication Data

US 2011/0005855 A1    Jan. 13, 2011

(30) Foreign Application Priority Data

Jul. 10, 2009  (JP) ................................ 2009-164047

(51) Int. Cl.
*H02P 27/00* (2006.01)
(52) U.S. Cl. .............. 318/722; 318/400.26; 318/400.27; 318/724
(58) Field of Classification Search ............... 318/400.1, 318/400.2, 400.26, 400.27, 400.28, 720, 318/722, 724; 363/95, 98, 132
See application file for complete search history.

(56) References Cited

U.S. PATENT DOCUMENTS

| | | | | |
|---|---|---|---|---|
| 4,788,485 | A | * | 11/1988 | Kawagishi et al. ........... 318/811 |
| 5,825,641 | A | * | 10/1998 | Mangtani ...................... 363/98 |
| 6,301,137 | B1 | * | 10/2001 | Li .................................. 363/98 |
| 7,583,523 | B2 | * | 9/2009 | Goto .............................. 363/98 |
| 7,737,648 | B2 | * | 6/2010 | Nagase et al. ........... 318/400.02 |
| 7,898,210 | B2 | * | 3/2011 | Hsieh et al. .................... 318/811 |

FOREIGN PATENT DOCUMENTS

| | | |
|---|---|---|
| JP | A-2002-345283 | 11/2002 |
| JP | A-2007-110788 | 4/2007 |
| JP | A-2007-110814 | 4/2007 |
| JP | A-2008-199712 | 8/2008 |
| JP | A-2009-001055 | 1/2009 |
| WO | WO 2010/106764 A1 | 9/2010 |

OTHER PUBLICATIONS

International Search Report issued Jun. 22, 2010 in related Application-No. PCT/JP2010/001702(with translation).
U.S. Appl. No. 13/256,023, filed Sep. 12, 2011 in the name of Atsuo Sakai et al.

* cited by examiner

*Primary Examiner* — Walter Benson
*Assistant Examiner* — Thai Dinh
(74) *Attorney, Agent, or Firm* — Oliff & Berridge, PLC

(57) ABSTRACT

A motor controller and an electric power steering system including the motor controller are provided. The motor controller has a microcomputer. When the on time of one of the lower potential-side FETs corresponding to the respective phases in a drive circuit becomes shorter than the detection time for detecting the phase current value, the microcomputer estimates the phase current value of the electric current undetectable phase based on the phase current values of the two phases other than the electric current undetectable phase corresponding to the relevant FET (blind estimation). When electric current detection is performed in the blind estimation, motor control signals are output, by which the switching state of the switching arm of the electric current undetectable phase is maintained and the power loss caused by the switching operation of the FETs in the two phases other than the electric current undetectable phase is compensated for.

6 Claims, 12 Drawing Sheets

MOTOR CONTROLLER AND ELECTRIC POWER STEERING SYSTEM

INCORPORATION BY REFERENCE

The disclosure of Japanese Patent Application No. 2009-164047 filed on Jul. 10, 2009 including the specification, drawings and abstract is incorporated herein by reference in its entirety.

BACKGROUND OF THE INVENTION

1. Field of the Invention

The invention relates to a motor controller and an electric power steering system.

2. Description of the Related Art

In a motor controller used in an electric power steering system (EPS) etc., a drive circuit (PWM inverter) for supplying electric power for drive to the a motor based on motor control signals is formed by connecting in parallel the switching arms corresponding to the respective phases, each switching arm including a pair of switching devices connected in series. As an example of such a motor controller, one, in which an electric current sensor is provided on the lower potential side (ground side) of each of the switching arms constituting the drive circuit, is available. Refer to Japanese Patent Application Publication No. 2009-1055, for example.

In the case of the application that requires smooth rotation of the motor and excellent quietness, such as the EPS, in general, the electric power for drive is supplied to a motor with sinusoidal-waveform energization. However, such a mode of electricity supply requires feedback of the phase current values. Thus, the drive circuit, which functions as the output section that outputs the electric power for drive, is provided with electric current sensors that detect the electric current values of the respective phases.

In such a motor controller, detection of the phase current values by the electric current sensors that are provided on the lower potential side (ground side) of the drive circuit is performed at the timing at which all the switching devices on the lower potential side (lower side), which are constituent elements of the drive circuit, are turned on.

As shown in FIG. 13, the generation of the motor control signals is performed based on the result of comparison between the triangular waves ($\delta 1$, $\delta 2$) and the DUTY command values (Du, Dv, and Dw) of the respective phases that are calculated when the feedback control of the electric current is performed. In this example, two triangular waves ($\delta 1$, $\delta 2$) ($\delta 1 > \delta 2$) that are shifted in the vertical direction are used to set the dead time for preventing the short circuit (arm short circuit) between the switching device on the higher potential side (upper side) and the switching device on the lower potential side (lower side) of the switching arm when the switching devices constituting the drive circuit are turned on and off.

When the DUTY command value(s) Du, Dv, and/or Dw is/are higher than the value of the triangular wave $\delta 1$, the motor control signals that turn on the switching device(s) on the higher potential side (upper side) corresponding to such a phase(s) are generated, and when the DUTY command value(s) Du, Dv, and/or Dw is/are lower than the value of the triangular wave $\delta 2$, the motor control signals that turn on the switching device(s) on the lower potential side (lower side) corresponding to such a phase(s) are generated. The phase current values are detected around the timing at which triangular waves $\delta 1$ and $\delta 2$ used to generate the motor control signals reach the "peak."

However, although the electric current is detected at the timing at which all the switching devices on the lower potential side are turned on, detection of the electric current requires a certain period of time. Thus, when the DUTY command values Du, Dv, and Dw increase, a situation occurs where the on time t0, during which the switching device on the lower potential side corresponding to the relevant phase is in an on state, becomes shorter than the detection time ts required to detect the phase current value, and therefore, the electric current cannot be detected. Thus, conventionally, the upper limit value Dmax is set for the DUTY command values Du, Dv, and Dw of the respective phases in consideration of the detection time ts in order to secure the detection time ts for detecting the phase current value (the time obtained by adding the dead time td, during which both of the switching devices are turned off to prevent the arm short circuit, to the detection time ts as a margin).

However, when the upper limit value Dmax is set for the DUTY command values Du, Dv, and Dw in this way, the voltage utilization factor is reduced. For example, when the detection time ts for detecting the phase current value is approximately 4 μs, which is approximately 8% in terms of duty factor, and the dead time td is approximately 1 μs, which is approximately 2% in terms of duty factor, the upper limit value Dmax is approximately 90% (100%-8%-2%=90%). This means that approximately 90% only of the voltage that the drive circuit can output can be used.

As the method that addresses the problem of the reduction in the voltage utilization factor, the blind estimation method is available. The blind estimation method is a method, in which with the use of the fact that the total of the phase current values of the respective phases is zero, the phase current value of the electric current undetectable phase is estimated based on the phase current values of the two phases other than the electric current undetectable phase that occurs because the on time t0 of the switching device on the lower potential side becomes shorter than the detection time ts for detecting the electric current value as described above.

In the case where the electric current undetectable phase occurs in this way, however, even when the phase current values of the two phases other than the electric current undetectable phase are detected, the switching devices are turned on and off in the electric current undetectable phase, which causes the noise therefrom to be included in the phase current values of the remaining two phases, of which the electric currents are detectable, which has been the cause of the deterioration in the accuracy in detecting the electric current in the blind estimation.

SUMMARY OF THE INVENTION

The invention has been made to solve the above problem and an object of the invention is to provide a motor controller and an electric power steering system, with which it is possible to improve the voltage utilization factor while ensuring smooth rotation of a motor and detection of electric current with high accuracy.

A motor controller according to an aspect of the invention has a control signal output device that outputs a motor control signal and a drive circuit that outputs three-phase electric power for drive based on the motor control signal. The drive circuit includes switching arms, in each of which a pair of switching devices each turned on and off according to the motor control signal are connected in series, the switching arms being connected to each other in parallel, corresponding to respective phases. The switching arms have, on a lower potential side thereof, electric current sensors that detect phase current values of the respective phases corresponding to the respective switching arms. The control signal output device generates the motor control signal by performing electric current feedback control based on phase current values of the respective phases that are detected at a timing at which all the switching devices on the lower potential side in the switching arms are turned on. When an on time of any one of the switching devices on the lower potential side becomes shorter than a detection time required to detect the electric current value, the control signal output device performs the electric current feedback control by estimating the phase current value of an electric current undetectable phase based on the phase current values of the two phases other than the electric current undetectable phase. When the control signal output device estimates the phase current value of the electric current undetectable phase based on the phase current values of the two phases other than the electric current undetectable phase, the control signal output device outputs the motor control signal, by which a switching state of the switching of the electric current undetectable phase is maintained and the power loss caused by a switching operation of the switching devices in the two phases other than the electric current undetectable phase is compensated for.

With this configuration, even when an electric current undetectable phase occurs, in which the electric current cannot be detected by the electric current sensor, it is possible to estimate the phase current value of the electric current undetectable phase by the blind estimation. In addition, when the phase current values of the two phases other than the electric current undetectable phase are detected, the switching state of the switching arm of the electric current undetectable phase is maintained, that is, switching operation thereof is not performed, so that it is possible to prevent the inclusion of the noise caused by the switching operation. As a result, even when limitation of the voltage to secure the detection time for detecting the phase current values of all the three phases (U, V, and W) is not imposed, it is ensured that the electric current is detected with high accuracy and therefore, it is possible to improve the voltage utilization factor.

In addition, by compensating for the power loss caused by the switching operation of the FETs in the two phases other than the electric current undetectable phase, the balance between the electric current detectable phases and the electric current undetectable phase, in which the power loss caused by the switching operation does not occur, is maintained. As a result, it is possible to suppress the occurrence of the distortion in the waveforms of the interphase voltages between the electric current undetectable phase and the two phases other than the electric current undetectable phase, and to suppress the occurrence of the torque ripple caused by such a distortion, so that it is possible to ensure smooth rotation of the motor.

In addition, by limiting the timing of performing the switching loss compensation control to the time period, during which the electric current is detected in the blind estimation, and by inhibiting the performance of the compensation calculation in the electric current undetectable phase, which is the non-switched phase, it is possible to suppress the increase in the calculation load. As a result, it is possible to avoid the increase in the throughput required of the information processor, which is a constituent element of the control signal output device, and the accompanying increase in costs.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
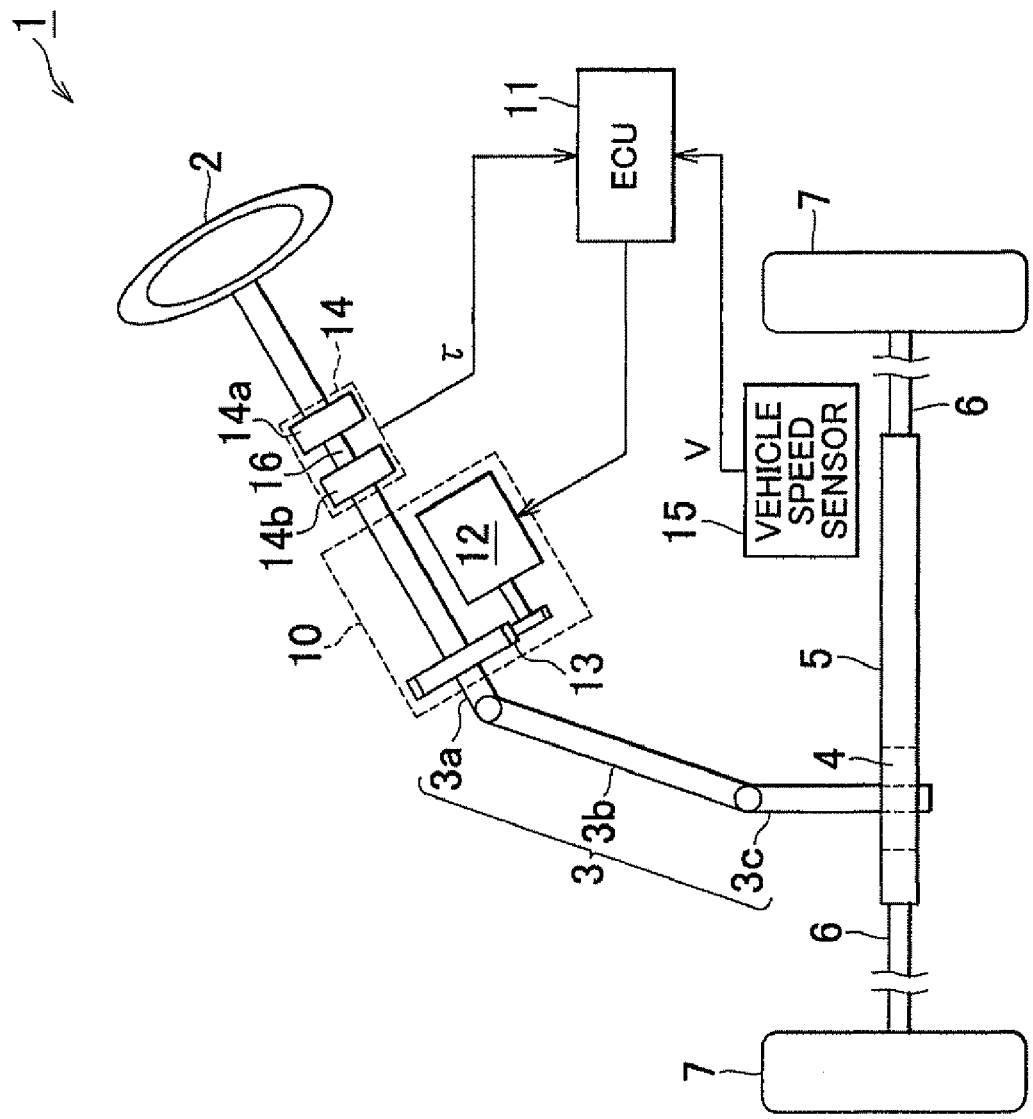
FIG. 1 is a schematic configuration diagram of an electric power steering system (EPS)

An embodiment of the invention will be described below with reference to the drawings. As shown in FIG. 1, in an electric power steering system (EPS) 1 of this embodiment, a steering shaft 3, to which a steering wheel 2 is fixed, is connected to a rack shaft 5 through a rack and pinion mechanism 4, so that the rotation of the steering shaft 3 caused by a steering operation is converted into a reciprocation of the rack shaft 5 via the rack and pinion mechanism 4. The steering shaft 3 is formed by connecting a column shaft 3a, an intermediate shaft 3b, and a pinion shaft 3c. The reciprocation of the rack shaft 5 caused by rotation of the steering shaft 3 is transmitted to knuckles (not shown) via tie rods 6 connected to both ends of the rack shaft 5, so that the steering angle of steered wheels 7, that is, the travel direction of a vehicle is changed.

The EPS 1 includes an EPS actuator 10, which functions as a steering assist device that applies the assisting force to assist steering operation to the steering system, and an electric control unit (ECU) 11, which functions as a controller that controls the operation of the EPS actuator 10.

The EPS of this embodiment is a so-called column-assisted EPS, in which a motor 12, which functions as a drive power source, is drivably connected to the column shaft 3a through a reduction gear 13. The EPS uses a well-known worm and wheel mechanism as the reduction gear 13. The motor 12 is a brushless motor. The motor 12 is rotated by receiving three-phase (U, V, W) electric power for drive from the ECU 11. The EPS actuator 10 is configured to reduce the speed of rotation of the motor 12 and transmits the rotation to the column shaft 3a, thereby applying the torque from the motor to the steering system as the assisting force.

A torque sensor 14 and a vehicle speed sensor 15 are connected to the ECU 11. The torque sensor 14 is disposed in the column shaft 3a. The torque sensor 14 has a torsion bar 16, provided on the steering wheel 2 side with respect to the reduction gear 13, and a pair of rotation angle sensors 14a and 14b that are provided at both ends of the torsion bar 16, and detects a steering torque τ based on the angle of torsion of the torsion bar 16. The ECU 11 is configured to perform power assist control by controlling the assisting torque produced by the motor 12, based on the steering torque τ and the vehicle speed V that are detected by the torque sensor 14 and the vehicle speed sensor 15, respectively.

Figure 2:
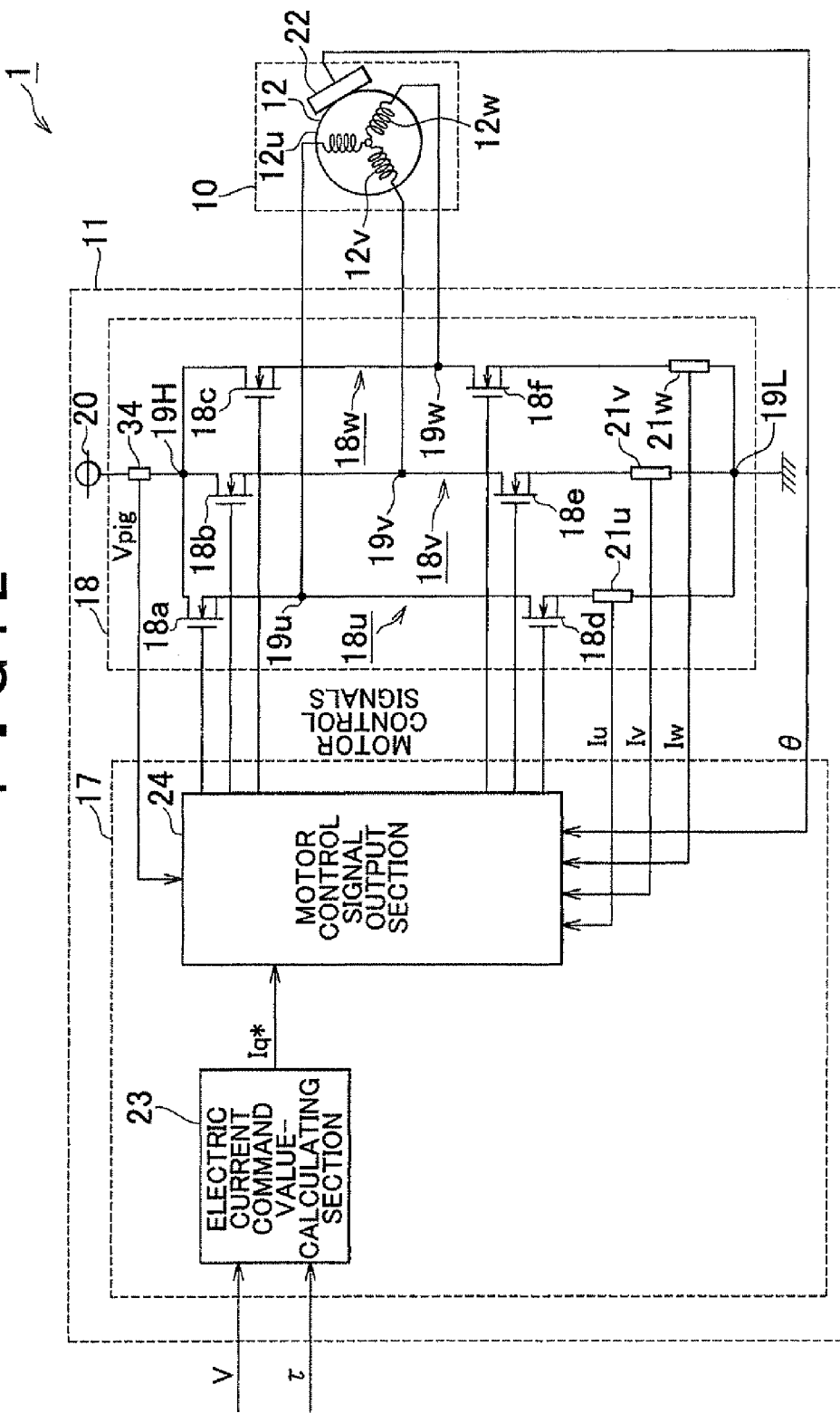
FIG. 2 is a block diagram showing an electrical configuration of the EPS.

Next, the electrical configuration of the EPS will be described. FIG. 2 is a control block diagram of the EPS of this embodiment. As shown in FIG. 2, the ECU 11 includes a microcomputer 17, which functions as a motor control signal output device that outputs motor control signals, and a drive circuit 18 that supplies three-phase electric power for drive to the motor 12 based on the motor control signal output from the microcomputer 17.

The drive circuit 18 is formed by connecting a plurality of FETs 18a to 18f, which function as switching devices. The drive circuit 18 is formed by connecting series circuits, consisting of pairs of the FETs 18a and 18d, the FETs 18b and 18; and the FETs 18c and 18f, respectively, to each other in parallel. Nodes 19u, 19v, and 19w between the FETs 18a and 18d, between the FETs 18b and 18e, and between the FETs 18c and 18f are respectively connected to motor coils 12u, 12v, and 12w of the respective phases of the motor 12.

The drive circuit 18 is a PWM inverter, in which each pair of the switching devices that are connected in series forms a unit (switching arm) and three switching arms 18u, 18v, and 18w corresponding to the respective phases are connected to each other in parallel. The motor control signals output from the microcomputer 17 are gate on/off signals that determine the switching state of the FETs 18a to 18f constituting the drive circuit 18.

The FETs 18a to 18f are turned on and off in response to the motor control signals applied to the gate terminals and the pattern of energization of the motor coils 12u, 12v, and 12w of the respective phases is changed, so that the direct current voltage of an on-board power supply 20 is converted to the three-phase (U, V, W) electric power for drive and the three-phase electric power is output to the motor 12.

The ECU 11 is provided with electric current sensors 21u, 21v, and 21w for detecting phase current values Iu, Iv, and Iw for energization of the motor 12. The sensors 21u, 21v, and 21w are provided in the drive circuit 18, more specifically, on the lower potential side (ground side, that is, lower side in FIG. 2) of the three switching arms 18u, 18v, and 18w connected to each other in parallel and thus corresponding to the respective phases of the motor 12, that is, the respective pairs of the FETs 18a and 18d, the FETs 18b and 18e, and the FETs 18c and 18f.

Figure 13:
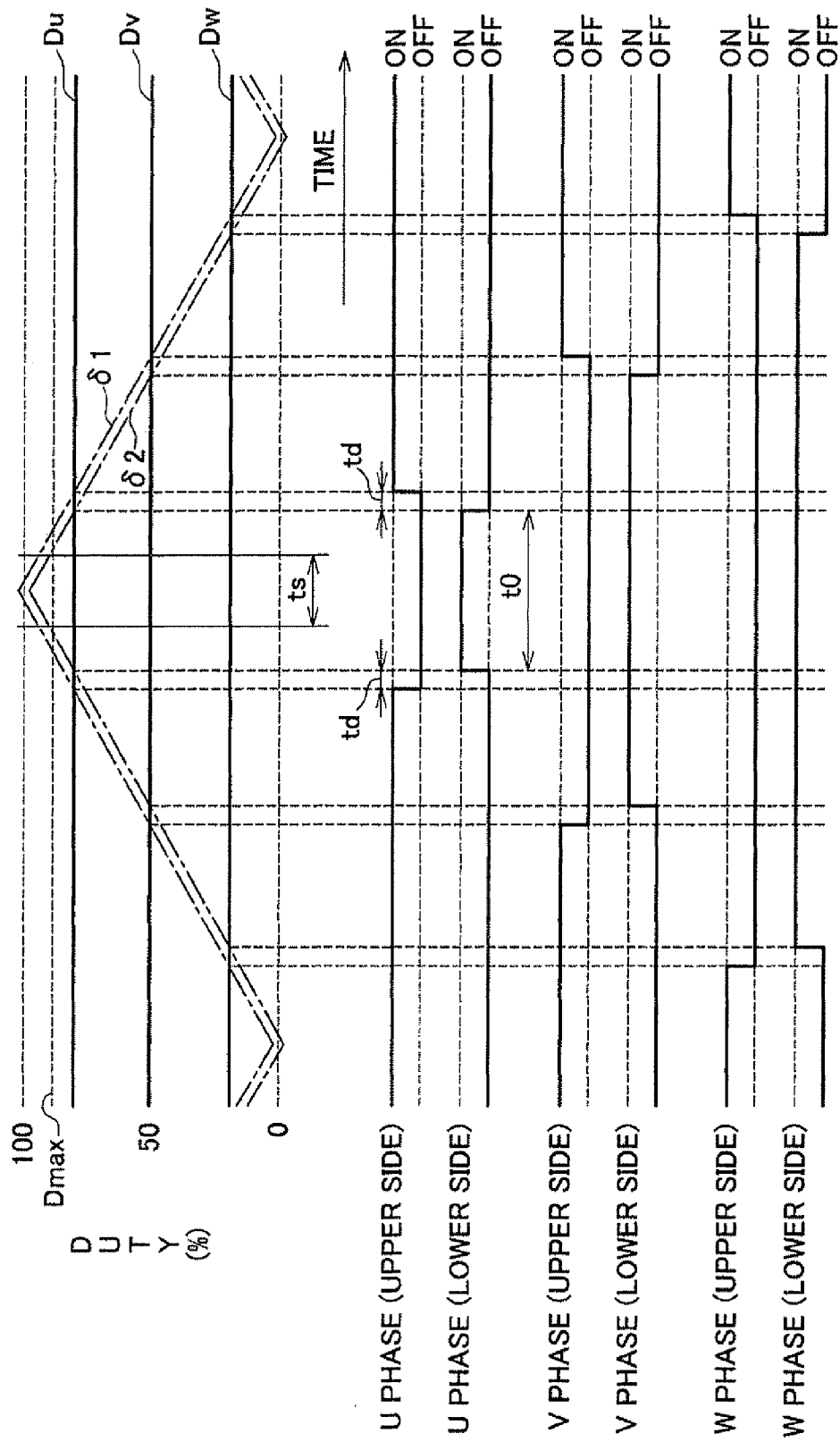
FIG. 13 is an explanatory diagram showing a mode of electric current detection.

Each of the electric current sensors 21u, 21v, and 21w is configured to perform detection of electric current based on the voltage across the resistor (shunt resistor) that is connected in series in the circuit. These resistors are connected in series in the circuit between, of nodes 19H and 19L between which the pairs of the switching devices corresponding to the respective phases, that is, the pairs of the FETs 18a and 18d, the FETs 18b and 18e, and the FETs 18c and 18f are connected to each other in parallel, the node 19L on the ground side and each of the ground-side FETs 18d, 18e, and 18f. The microcomputer detects the phase current values Iu, Iv, and Iw based on the output signals from the electric current sensors 21u, 21v, and 21w in a predetermined sampling cycle, specifically, at the timing at which all of the FETs 18d, 18e, and 18f on the lower potential side are turned on, that is, around the timing at which triangular waves δ1 and δ2 used to generate the motor control signals reach the "peak" (see FIG. 13).

The microcomputer 17 receives, along with these phase current values Iu, Iv, and Iw, and the steering torque τ and the vehicle speed V detected by the torque sensor 14 and the vehicle speed sensor 15, respectively, as well as a rotation angle (electrical angle) θ of the motor 12 that is detected by a rotation angle sensor 22 provided for the motor 12. The microcomputer 17 outputs the motor control signals to the drive circuit 18 based on the phase current values Iu, Iv, and Iw, the rotation angle θ, the steering torque τ, and the vehicle speed V.

More specifically, the microcomputer 17 determines the assisting force (target assisting force) to be applied to the steering system, based on the steering torque and the vehicle speed V, and generates the motor control signals by performing the electric current control based on the detected phase current values Iu, Iv, and Iw and the detected rotation angle θ to cause the motor 12 to produce the assisting force.

The microcomputer 17 includes: an electric current command value-calculating section 23 that calculates an electric current command value as a target value of control of the assisting force applied to the steering system, that is, the motor torque; and a motor control signal output section 24, which functions as the control signal output device that outputs the motor control signals to the drive circuit 18 based on the electric current command value calculated by the electric current command value-calculating section 23.

The electric current command value-calculating section 23 calculates the target assisting force to be produced by the EPS actuator 10, based on the steering torque τ and the vehicle speed V detected by the torque sensor 14 and the vehicle speed sensor 15, and calculates the electric current command value (Iq*) as the target value of control of the motor torque corresponding to the target assisting force. The larger the input steering torque τ is and the lower the vehicle speed V is, the larger the target assisting force calculated by the electric current command value-calculating section 23 is. The electric current command value-calculating section 23 outputs the electric current command value corresponding to the target assisting force to the motor control signal output section 24.

The motor control signal output section 24 receives the electric current command value output by the electric current command value-calculating section 23 as well as the phase current values Iu, Iv, and Iw and the rotation angle θ of the motor 12. The electric current command value-calculating section 23 outputs a q-axis electric current command value Iq* as the electric current command value to the motor control signal output section 24. The motor control signal output section 24 outputs the motor control signals by performing the electric current feedback control in the d/q coordinate system, based on the phase current values Iu, Iv, and Iw and the rotation angle θ (electrical angle).

Figure 3:
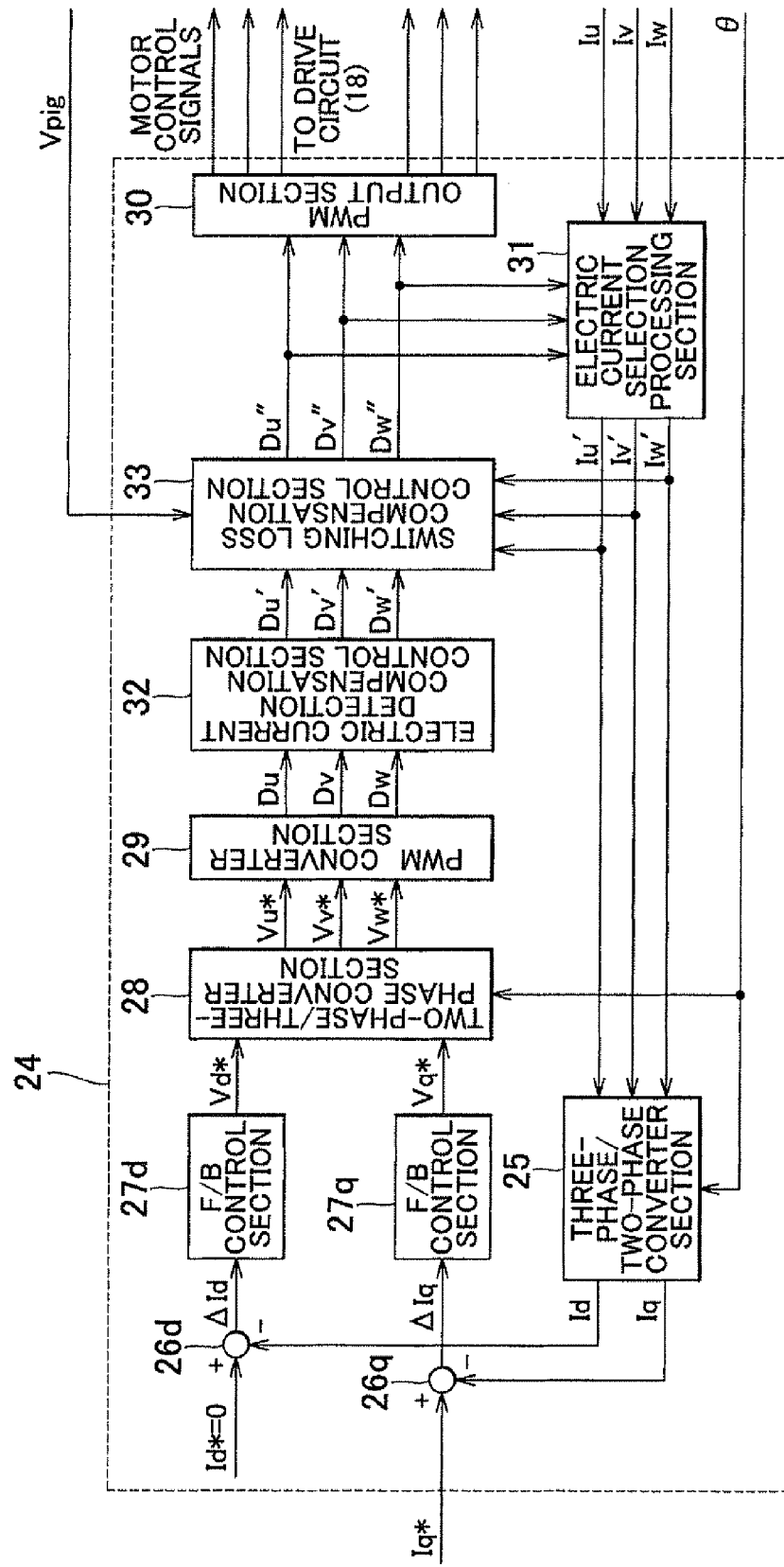
FIG. 3 is a block diagram showing a schematic configuration of a motor control signal output section.

As shown in FIG. 3, the phase current values Iu, Iv, and Iw (Iu', Iv', and Iw') input to the motor control signal output section 24 are input to a three-phase/two-phase converter section 25 via an electric current selection processing section 31 to be described later and converted into a d-axis electric current value Id and a q-axis electric current value Iq of the d/q coordinate system based on the rotation angle θ of the motor 12 by the three-phase/two-phase converter section 25. The q-axis electric current value Iq is input to a subtracter 26q along with the q-axis electric current command value Iq* received from the electric current command value-calculating section 23. The d-axis electric current value Id is input to a subtracter 26d along with the d-axis electric current command value Id* (Id*=0).

Both of a d-axis electric current deviation ΔId and a q-axis electric current deviation ΔIq calculated by the subtracters 26d and 26q are input to corresponding feedback (F/B) control sections 27d and 27q. In the F/B control sections 27d and 27q, feedback control is performed so as to cause the d-axis electric current value Id and the q-axis electric current value Iq that are actual electric current values to follow the d-axis electric current command value Id* and the q-axis electric current command value Iq* output by the electric current command value-calculating section 23.

Both of a d-axis voltage command value Vd* and a q-axis voltage command value Vq* are calculated by multiplying the input d-axis electric current deviation ΔId and the input q-axis electric current deviation ΔIq by a predetermined F/B gain (PI gain). The calculated d-axis voltage command value Vd* and the calculated q-axis voltage command value Vq* are input to a two-phase/three-phase converter section 28 along with the rotation angle θ. Then, in the two-phase/three-phase converter section 28, three-phase voltage command values Vu*, Vv*, and Vw* are calculated.

The phase voltage command values Vu*, Vv*, and Vw* are input to a PWM converter section 29 and DUTY command values Du, Dv, and Dw based on the phase voltage command values Vu*, Vv*, and Vw* are generated in the PWM converter section 29. The DUTY command values Du, Dv, and Dw are input to a PWM output section 30 via an electric current detection compensation control section 32 and a switching loss compensation control section 33 that are described later. The motor control signal output section 24 generates gate on/off signals (see FIG. 13) calculated by the PWM output section 30 based on the result of comparison between the DUTY command values Du, Dv, and Dw (Du", Dv", and Dw") and the triangular waves (δ1 and δ2), that is, the signals that determine the switching state (on/off operation) of the FETs 18a to 18f.

The microcomputer 17 is configured to control the operation of the motor 12 by controlling the supply of the electric power for drive to the motor 12 by outputting the motor control signals output by the motor control signal output section 24 to the gate terminals of the switching devices constituting the drive circuit 18.

Next, a mode of the electric current detection compensation control according to this embodiment will be described. As described above, the microcomputer 17 detects the phase current values Iu, Iv, and Iw in the switching arms 18u, 18v, and 18w constituting the drive circuit 18 at the timing at which all the FETs 18d, 18e, and 18f on the lower potential side are turned on. In this case, however, if an upper limit value Dmax of the DUTY command values Du, Dv, and Dw is not set, when the DUTY command values Du, Dv, and Dw increase, a case would occur, in which the on time t0 of the lower potential-side PET of a relevant phase, during which the FET is maintained in an on state, becomes shorter than a detection time ts required to detect the phase current value and therefore, the electric current of the relevant phase cannot be detected (see FIG. 4, and Du>Dmax in this case).

Thus, when the on time t0 of one of the FETs 18d, 18e, and 18f on the lower potential side corresponding to the respective phases becomes shorter than the detection time ts for detecting the electric current value, based on the electric current values of two phases other than the electric current undetectable phase corresponding to the relevant PET, blind estimation is performed, in which the phase current value of the electric current undetectable phase is estimated.

Specifically, as shown in FIG. 3, the motor control signal output section 24 is provided with the electric current selection processing section 31, and the phase current values Iu, Iv, and Iw (Iu', Iv', and Iw') input to the motor control signal output section 24 are input to the three-phase/two-phase converter section 25 via the electric current selection processing section 31. The electric current selection processing section 31 receives the DUTY command values Du, Dv, and Dw (Du', Dv', and Dw') of the respective phases corresponding to the phase voltage command values Vu*, Vv*, and Vw* calculated by performing the electric current FIB control. When any one of the input DUTY command values Du, Dv, and Dw of the respective phases indicates that the detection time is for detecting the electric current value becomes shorter than the on time t0 of the lower potential-side FET of the relevant phase, the electric current selection processing section 31 performs the blind estimation and outputs the calculated phase current values Iu', Iv', and Iw' to the three-phase/two-phase converter section 25.

The electric current selection processing section 31 compares the input DUTY command values Du, Dv, and Dw of the respective phases with a threshold value Dth corresponding to the value of the upper limit value Dmax when it is assumed that the upper limit value Dmax of the DUTY command values Du, Dv, and Dw is set. The upper limit value Dmax in this case is the value that is determined in consideration of the detection time ts for detecting the electric current value (see FIG. 13, and this is the value corresponding to the time obtained by adding, to the detection time ts, the dead time td as a margin, during which both switching devices are turned off to prevent the arm short circuit). The electric current selection processing section 31 performs the blind estimation based on the result of comparison between the threshold value Dth and the DUTY command values Du, Dv, and Dw.

Figure 5:
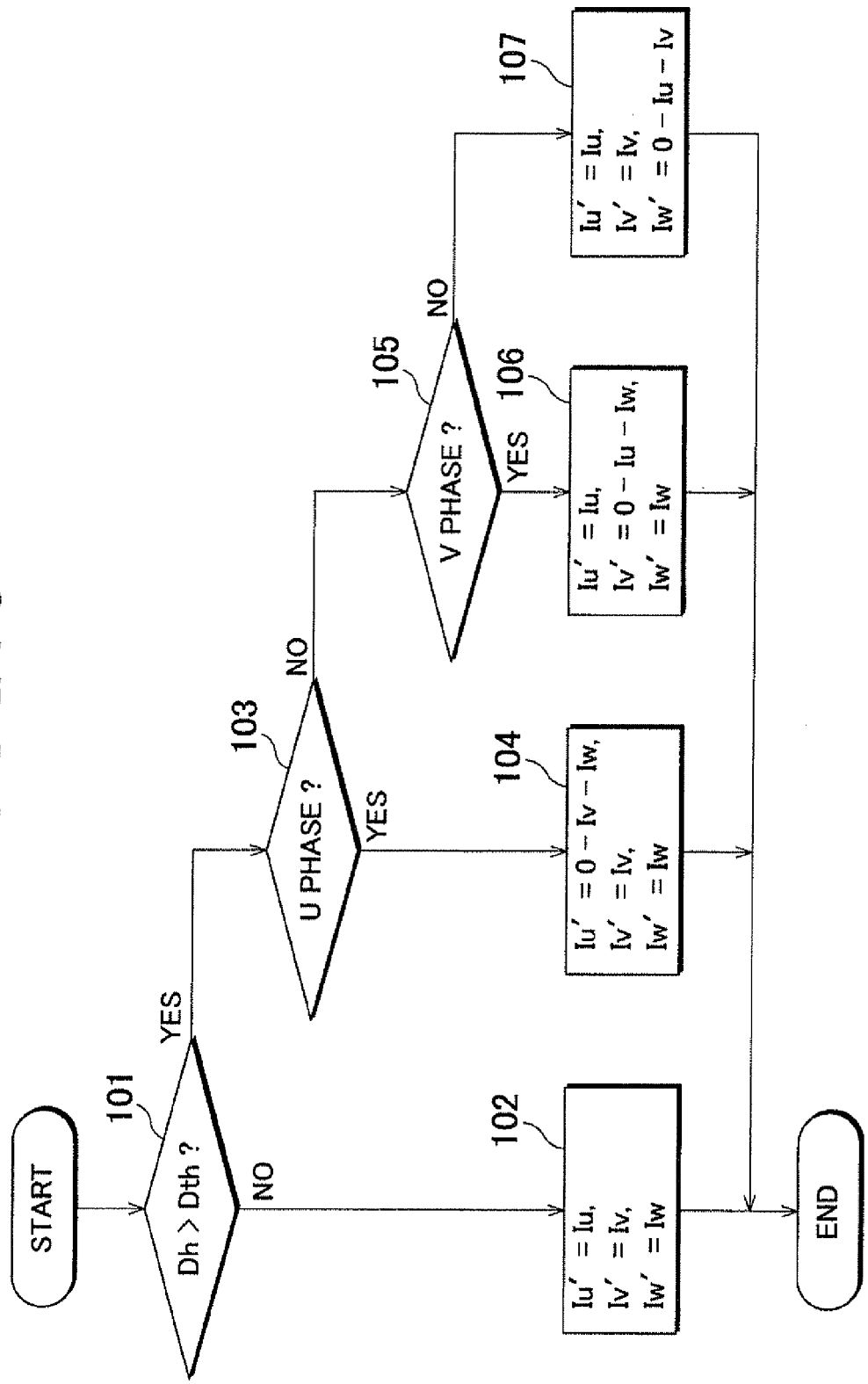
FIG. 5 is a flow chart showing a procedure of blind estimation.

Specifically, as shown in the flow chart of FIG. 5, the electric current selection processing section 31 determines whether a DUTY command value Dh that is the highest value of the input DUTY command values Du, Dv, and Dw of the respective phases is greater than the threshold value Dth (step 101). When the DUTY command value Dh is equal to or less than the threshold value Dth (Dh≦Dth, NO in step 101), the blind estimation is not performed and the phase current values Iu, Iv, and Iw detected based on the output signals from the electric current sensors 21u, 21v, and 21w are output to the three-phase/two-phase converter section 25 (Iu'=Iu, Iv'=Iv, Iw'=Iw, step 102).

When it is determined in step 101 that the DUTY command value Dh that is the highest value is greater than the threshold value Dth (Dh>Dth, YES in step 101), the electric current selection processing section 31 determines whether the DUTY command value Dh is the DUTY command value Du of the U phase (step 103). When it is determined that the DUTY command value Dh is the DUTY command value Du of the U phase (YES in step 103), that is, when the U phase is the electric current undetectable phase, the blind estimation is performed, in which the phase current value Iu' of the U phase is estimated based on the phase current value Iv of the V phase and the phase current value Iw of the W phase.

In this case, the phase current value Iu' of the U phase is obtained by subtracting the phase current value Iv of the V phase and the phase current value Iw of the W phase from zero. The electric current selection processing section 31 outputs the phase current values Iu', Iv', and Iw' obtained by performing the blind estimation to the three-phase/two-phase converter section 25 (Iu'=0−Iv−Iw, Iv'=Iv, Iw'=Iw, step 104).

When it is determined in step 103 that the DUTY command value Dh that is the highest value is not the DUTY command value Du of the U phase (NO in step 103), the electric current selection processing section 31 subsequently determines whether the DUTY command value Dh is the DUTY command value Dv of the V phase (step 105). When it is determined that the DUTY command value Dh is the DUTY command value Dv of the V phase (YES in step 105), that is, when the V phase is the electric current undetectable phase, the blind estimation is performed, in which the phase current value Iv' of the V phase is estimated based on the phase current value Iu of the U phase and the phase current value Iw of the W phase (step 106).

The phase current value Iv' of the V phase in this case is obtained by subtracting the phase current value Iu of the U phase and the phase current value Iw of the W phase from zero. The electric current selection processing section 31 outputs the phase current values Iu', Iv', and Iw' obtained by performing the blind estimation to the three-phase/two-phase converter section 25 (Iu'=Iu, Iv'=0−Iu−Iw, Iw'=Iw, step 106).

When it is determined in step 105 that the DUTY command value Dh that is the highest value is not the DUTY command value Dv of the V phase (NO in step 105), the electric current selection processing section 31 determines that the W phase is the electric current undetectable phase. Then, the blind estimation is performed, in which the phase current value Iw' of the W phase is estimated based on the phase current value Iu of the U phase and the phase current value Iv of the V phase.

The phase current value of the W phase in this case is obtained by subtracting the phase current value Iu of the U phase and the phase current value Iv of the V phase from zero. The electric current selection processing section 31 outputs the phase current values Iu', Iv', and Iw' obtained by performing the blind estimation to the three-phase/two-phase converter section 25 (Iu'=Iu, Iv'=Iv, Iw'=0−Iu−Iv, step 107).

By performing the blind estimation in this way, it is possible to obtain the phase current values Id, Iv', and Iw' of all the three phases even when the DUTY command values Du, Dv, and Dw increase. However, with regard to the detection of electric current in the blind estimation, there is a possibility that the accuracy in detecting the electric current can be deteriorated by the inclusion of noise as described above. Specifically, when the phase current values of the two phases other than the electric current undetectable phase are detected, the FETs constituting the switching arm of the electric current undetectable phase are turned on and off and as a result, noise is included in the detected phase current values of the two phases.

To address the problem of inclusion of noise, when the electric current is detected in the blind estimation, the microcomputer 17 of this embodiment outputs the motor control signals that maintain the switching state of the switching arm of the electric current undetectable phase while the phase current values of the two phases, other than the electric current undetectable phase, that are the basis of the blind estimation are detected. When the electric current is detected in the blind estimation, the motor control signals are output that maintain the state in which the FET on the higher potential side is on and the FET on the lower potential side is off in the switching arm of the electric current undetectable phase. Thus, even when the DUTY command values Du, Dv, and Dw increase, it is ensured that the electric current is detected with high accuracy.

Specifically, as shown in FIG. 3, the motor control signal output section 24 is provided with the electric current detection compensation control section 32 and the DUTY command values Du, Dv, and Dw of the respective phases generated in the PWM converter section 29 are input to the electric current detection compensation control section 32. When the electric current is detected in the blind estimation, the electric current detection compensation control section 32 outputs, to the PWM output section 30 through the switching loss compensation control section 33 to be described later, the DUTY command values Du', Dv', and Dw' after the correction made so that the higher potential-side FET of the electric current undetectable phase is maintained in an on state and the lower potential-side FET thereof is maintained in an off state.

Figure 6:
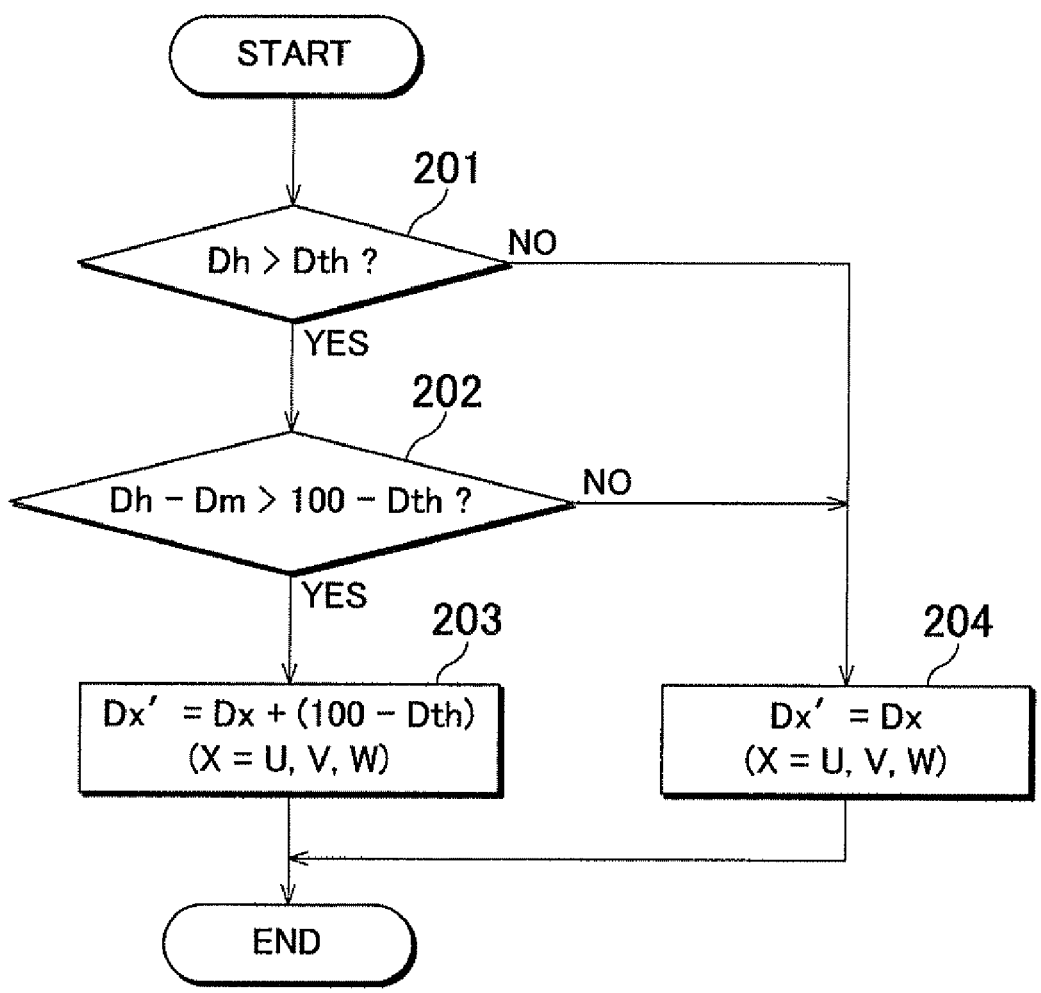
FIG. 6 is a flow chart showing a procedure of the electric current detection compensation control.

As shown in the flow chart of FIG. 6, the electric current detection compensation control section 32 determines whether the DUTY command value Dh that is the highest value of the DUTY command values Du, Dv, and Dw of the respective phases input from the PWM converter section 29 is greater than the threshold value Dth corresponding to the upper limit value Dmax (step 201).

When it is determined in step 201 that the DUTY command value Dh that is the highest value is greater than the threshold value Dth (Dh>Dth, YES in step 201), that is, when it is determined that the detection of electric current in the blind estimation is performed because of the occurrence of the electric current undetectable phase, it is determined in the next step 202 whether the condition for performing the electric current detection compensation control is met. Specifically, it is determined whether the value (Dh−Dm) obtained by subtracting a DUTY command value Dm that is the median of the DUTY command values Du, Dv, and Dw of the respective phases from the DUTY command value Dh that is the highest value is greater than the value (100−Dth) obtained by subtracting the threshold value Dth from 100 (step 202).

When it is determined in step 202 that the condition for performing the electric current detection compensation control is met (Dh−Dm>100−Dth, YES in step 202), the electric current detection compensation control section 32 performs the electric current detection compensation control such that the higher potential-side FET of the electric current undetectable phase is maintained in an on state and the lower potential-side FET thereof is maintained in an off state. Specifically, the value obtained by subtracting the DUTY command value Dh that is the highest value from 100 is added to the DUTY command values Dx (x=U, V, and W) of the respective phases (Dx'=Dx+(100−Dh), step 203).

When it is determined in step 201 that the DUTY command value Dh that is the highest value is equal to or lower than the threshold value Dth (Dh≦Dth, NO in step 201), or when it is determined in step 202 that the condition for performing the electric current detection compensation control is not met (Dh−Dm≦100−Dth, NO in step 202), the electric current detection compensation control section 32 does not perform the process of step 203 and outputs the DUTY command values Du, Dv, and Dw of the respective phases input from the PWM converter section 29, to the PWM output section 30 without correction (Dx'=Dx, step 204).

Figure 4:
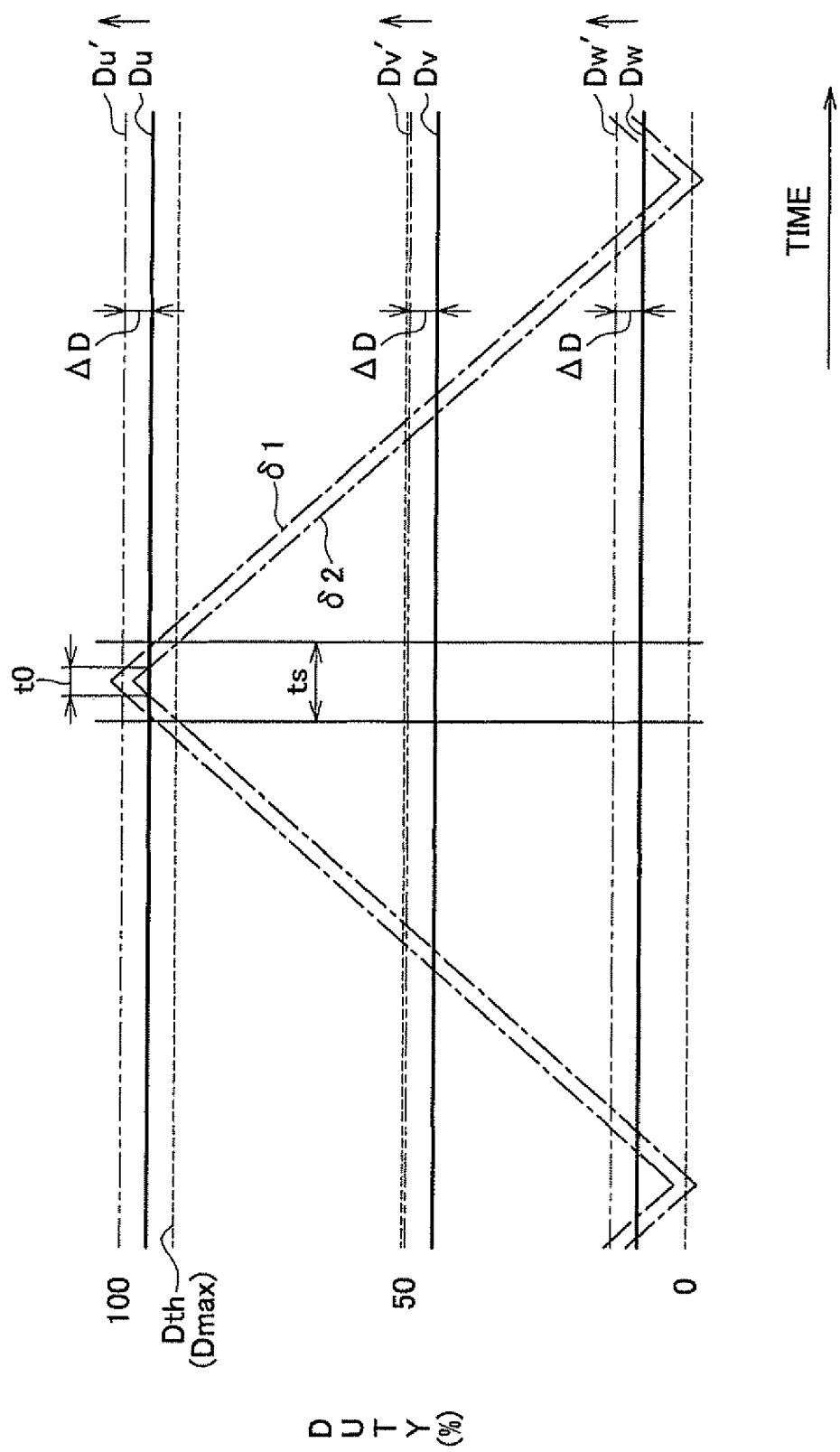
FIG. 4 is an explanatory diagram showing a mode of electric current detection compensation control.

In the example shown in FIG. 4, for example, the switching arm 18u of the U phase is maintained in the state where the higher potential-side FET 18a is on and the lower potential-side FET 18d is off, by raising the DUTY command value Du of the U phase, which is the electric current undetectable phase, to 100. When the electric current is detected in the blind estimation, the FETs 18a and 18d of the electric current undetectable phase (U phase) are neither turned on nor turned off, so that it is possible to prevent the inclusion of noise into the phase current values (Iv, Iw) detected in the two phases (V, W) other than the electric current undetectable phase.

The difference value AD used when the DUTY command value Du of the U phase, which is the electric current undetectable phase, is raised to 100 as described above is also added to the DUTY command values Dv and Dw of the remaining two phases (V phase and W phase) other than the electric current undetectable phase. In other words, all the DUTY command values Du, Dv, and Dw are raised to the higher potential side so that the DUTY command value of the electric current undetectable phase becomes 100. In this way, this embodiment is configured so that the influence on the interphase voltages (line voltages) of the respective phases caused by maintaining the switching state of the switching arm of the electric current undetectable phase is cancelled.

Figure 7:
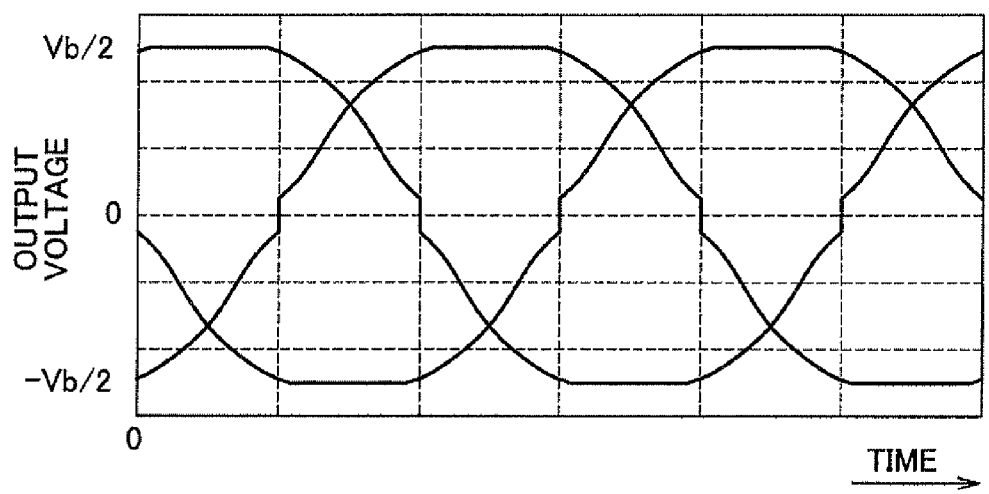
FIG. 7 is a graph showing output voltage waveforms when the electric current detection compensation control is not performed.
Figure 8:
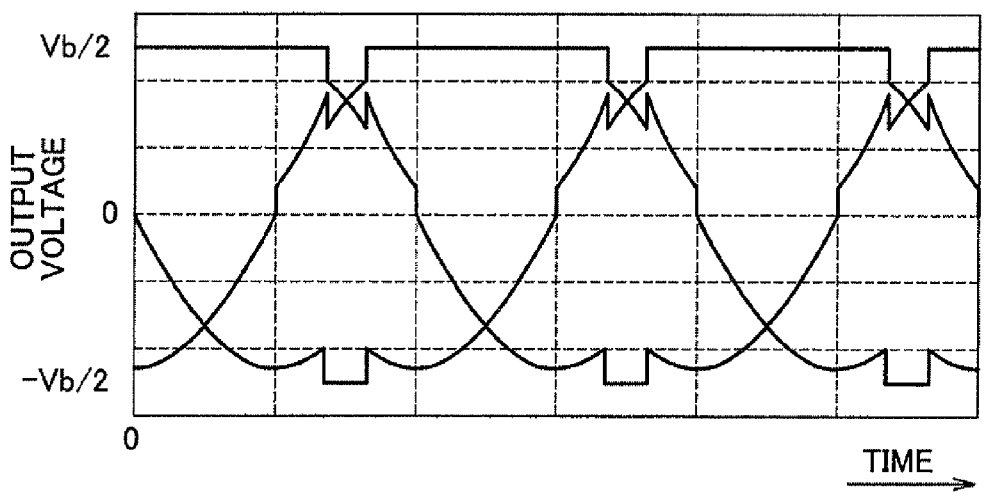
FIG. 8 is a graph showing output voltage waveforms when the electric current detection compensation control is performed.

Specifically, the microcomputer 17 is configured to output the motor control signals so that the output voltage waveform of the drive circuit 18 becomes the well-known pseudo third harmonic-superimposed sinusoidal wave as shown in FIG. 7, thereby improving the voltage utilization factor. When the electric current detection compensation control shown in step 203 is applied to the motor control signals that form the output voltage waveform, the output voltage waveform of the drive circuit 18 is shaped as shown in FIG. 8.

When the electric current detection compensation control is performed, in which the difference value AD (see FIG. 4) for raising is added to all the DUTY command values Du, Dv, and Dw as described above to maintain the switching state of the switching arm of the electric current undetectable phase, the output voltage of the respective phases is shifted to the higher potential side. Specifically, by causing a drift of the neutral point as in the case of superimposition of the pseudo third harmonic, the waveform of the interphase voltages (line voltages) of the respective phases becomes a certain sinusoidal waveform regardless of whether the electric current detection compensation control is performed. In this embodiment, this ensures smooth rotation of the motor 12 and at the same time, it is possible to detect the electric current with high accuracy.

Figure 9:
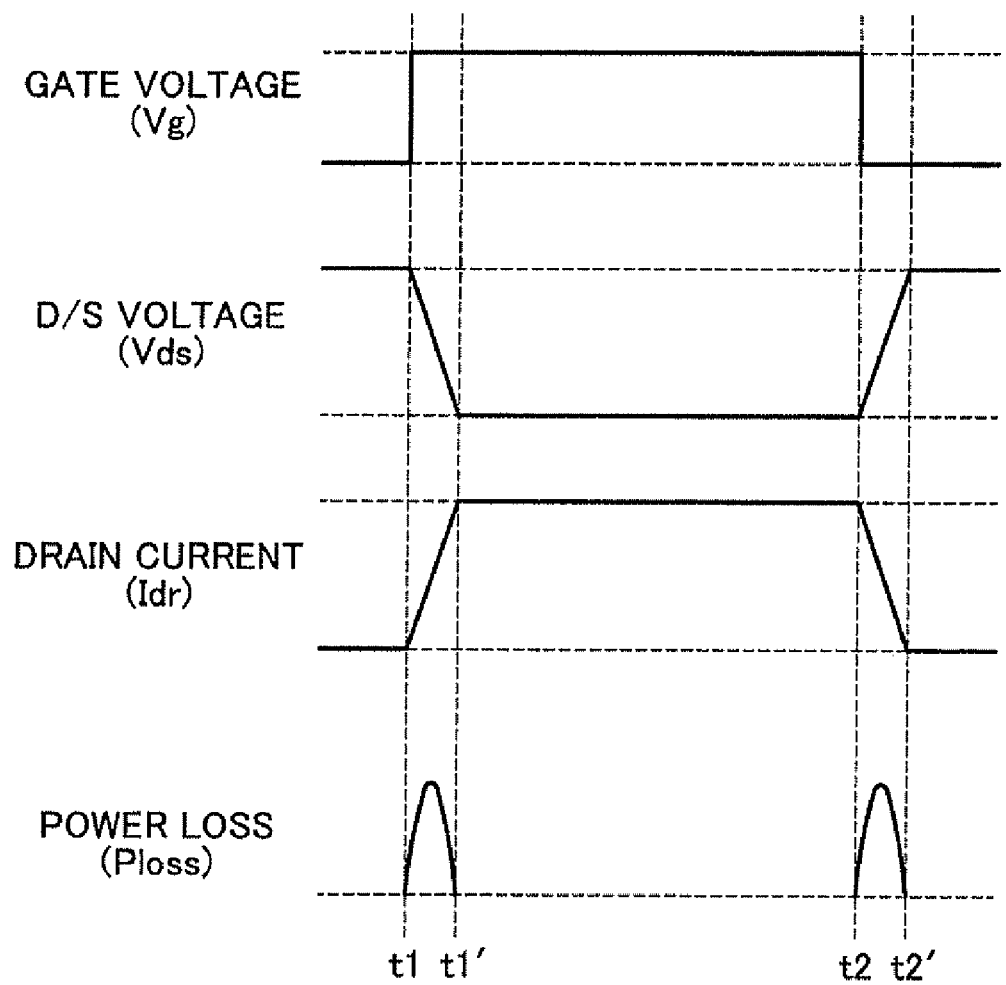
FIG. 9 is an explanatory diagram showing transient characteristics of the switching operation and power loss caused thereby.

Next, a mode of the switching loss compensation control according to this embodiment will be described. As shown in FIG. 9, at the time of switching operation of the FETs 18a to 18f constituting the drive circuit 18, the electric power loss due to the transient characteristics of the switching operation occurs. Even when the gate voltage Vg applied to the FETs 18a to 18f in the form of the motor control signals rises or falls in a rectangular waveform (t1, t2), neither the rise nor the fall of the drain-source voltage (D/S voltage) Vds becomes a rectangular waveform (t1 to t1', t2 to t2'). The product of the drain-source voltage Vds and the drain current Idr up to the time the switching operation completes gives the power loss Ploss.

Japanese Patent Application Publication No. 2008-199712, for example, discloses the compensation control related to such energy loss caused by the operation of the FETs 18a to 18f. When the compensation control is performed, it is possible to reduce the deviation between the target output and the actual output to improve the output efficiency.

In actuality, however, the influence of the energy loss caused by the switching operation on the motor output is little. In addition, the switching operation of the FETs 18a to 18f is uniformly performed in all the switching arms 18u, 18v, and 18w of the respective phases and therefore, no torque ripple due to the energy loss caused by the switching operation occurs. Thus, in general, the fact is that no particular measure against the energy loss caused by the switching operation is not taken, in consideration of the increase of the calculation load accompanying the compensation control.

In the EPS 1 of this embodiment, however, the electric current detection compensation control maintains the switching state of the switching arm of the electric current undetectable phase when the electric current undetectable phase occurs. Specifically, the phase occurs, in which neither the energy loss caused by the switching operation nor the voltage drop caused thereby occurs. As a result, there is a case where the balance of the voltage drop due to the power loss breaks down and the influence of the power loss caused by the switching operation of the FETs 18a to 18f therefore surfaces as the torque ripple.

Specifically, when the electric current detection compensation control is performed, the FETs of the electric current undetectable phase are neither turned on nor turned off and the FETs of the remaining two phases are turned on and off (see FIG. 2). Thus, the voltage drop due to the power loss caused by the switching operation also occurs only in the two phases other than the electric current undetectable phase and the waveform of the interphase voltage between the electric current undetectable phase and the two phases (electric current detectable phases) other than the electric current undetectable phase is distorted.

Figure 10:
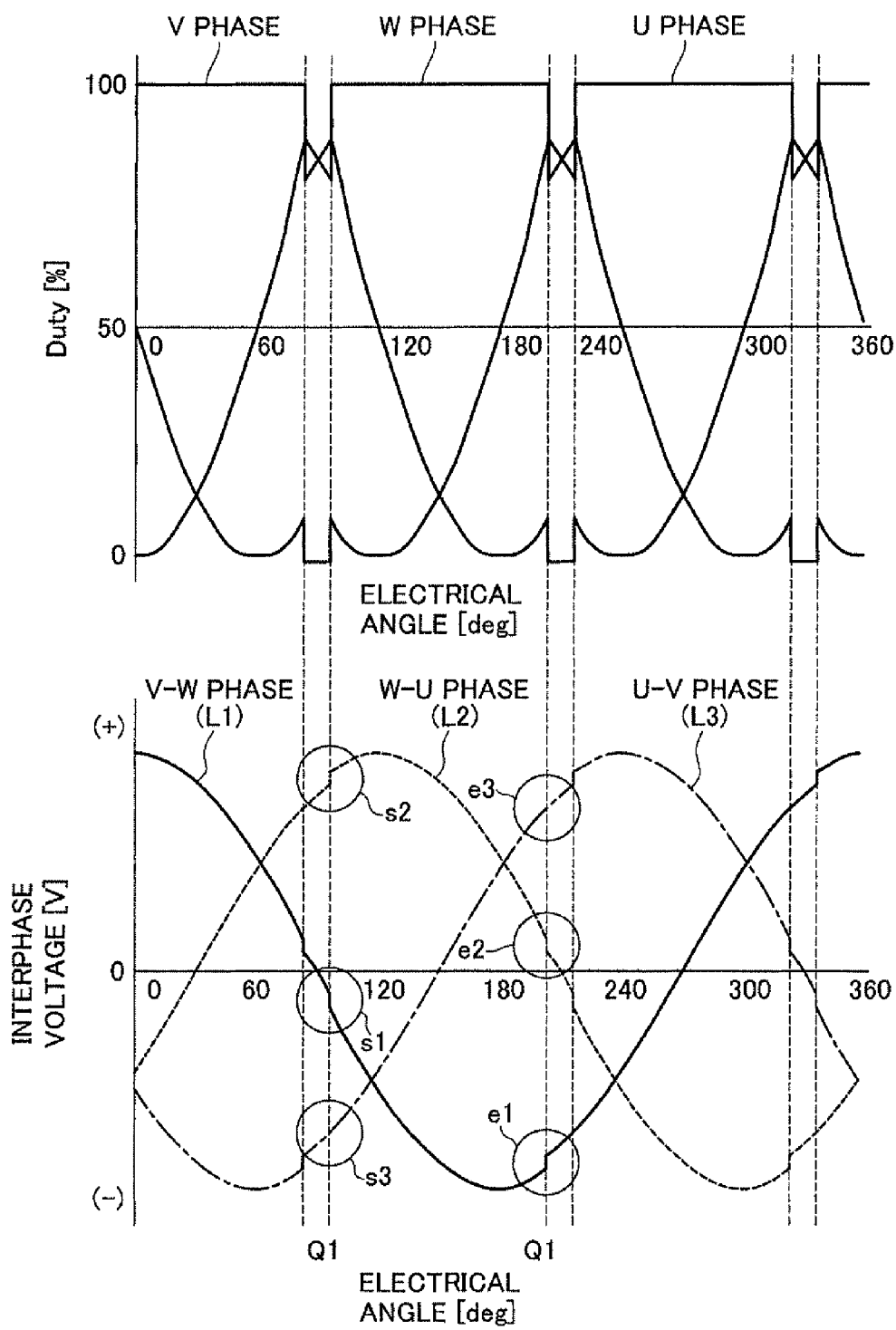
FIG. 10 is an explanatory diagram showing distortion of interphase voltages caused by performing the electric current detection compensation control.

For example, when the W phase is the electric current undetectable phase and the electric current detection compensation control is performed, switching operation of the FETs 18c and 18f of the W phase is not performed and switching operation of the FETs 18a and 18d and FETs 18b and 18e of the remaining two phases only is performed (see FIG. 2). The voltage drop due to the power loss caused by the switching operation also occurs only in the U and V phases. As a result, as shown in FIG. 10, at the start (θ1) and the end (θ2) of the electric current detection compensation control with the W phase being electric current undetectable phase, the waveforms of the interphase voltages between the electric current undetectable phase and the electric current detectable phases, that is, waveforms L1 and L2 of the interphase voltages between the V and W phases and between the W and U phases, are distorted (regions s1 and s2 and regions e1 and e2).

In the waveform of the interphase voltage between the two phases other than the electric current undetectable phase, that is, in the waveform L3 of the interphase voltage between the U and V phases, the voltage drops due to the power loss caused by the switching operation cancel out. Thus, even at the start (θ1) and the end (θ2) of the electric current detection compensation control, the waveform L3 of the interphase voltage between the U and V phases is not distorted (region s3 and e3). Meanwhile, in the wave forms L1 and L2 of the interphase voltages between V and W phases and between W and U phases, which are the waveforms of the interphase voltages between the electric current undetectable phase and the electric current detectable phases, the distortion as described above occurs because the voltage drops in the electric current detectable phases do not cancel out.

In order to suppress the distortion, when the electric current detection compensation control is performed, the microcomputer 17 performs the compensation control of the power loss caused by the operation of the FETs in the two phases other than the electric current undetectable phase (switching loss compensation control). In this way, the embodiment is configured to suppress the occurrence of the torque ripple due to the distortion of the interphase voltage waveform as described above, thereby ensuring smooth rotation of the motor.

More specifically, as shown in FIG. 3, in the motor control signal output section 24, the switching loss compensation control output section 33 is provided between the electric current detection compensation control section 32 and the PWM output section 30. The DUTY command values Du', Dv', and Dw' of the respective phases output from the electric current detection compensation control section 32 are input to the switching loss compensation control section 33. When the electric current detection compensation control is performed and a non-switched phase therefore occurs, in which no switching operation is performed, the DUTY command values Du', Dv', and Dw' corrected by the amount corresponding to the voltage drop due to the power loss caused by the switching operation in the two phases other than the electric current undetectable phase are output to the PWM output section 30.

The value ($\epsilon$) of the voltage drop due to the power loss caused by the switching operation is the product of an equivalent resistance R corresponding to the power loss and the phase current values Ix ($\epsilon$=R×Ix, X=U, V, and W). Thus, by determining voltage drop values $\epsilon$m and $\epsilon$l of the two phases other than the electric current undetectable phase and converting the voltage drop values $\epsilon$m and $\epsilon$l into DUTY(s) (%), it is possible to obtain correction values $\Delta$Dm and $\Delta$Dl corresponding to the voltage drop due to the power loss caused by the switching operation. When the electric current detection compensation control is performed and a non-switched phase therefore occurs, these correction values $\Delta$Dm and $\Delta$Dl are added to the DUTY command values Dm and Dl of the two phases other than the electric current undetectable phase, whereby the switching loss compensation control is performed.

The highest value of the DUTY command values Du, Dv, and Dw of the respective phases is "Dh" and the median and the lowest value thereof are "Dm" and "Dl", respectively. Thus, when the electric current detection compensation control is performed, in which the switching state of the electric current undetectable phase is maintained, the DUTY command value for the electric current undetectable phase is "Dh" and the DUTY command values for the other two phases are "Dm" and "Dl", respectively. When the DUTY command value Dh that is the highest value is the value (100%) that indicates that the switching state of the switching arm of the relevant phase should be maintained, the switching loss compensation control section 33 of this embodiment performs the switching loss compensation control.

In this embodiment, the switching loss compensation control section 33 receives the applied voltage (power supply voltage) Vpig applied to the drive circuit 18 (FETs 18a to 18f) that is detected by the voltage sensor 34 (see FIG. 2). The phase current values Iu', Iv', and Iw' of the respective phases are input to the switching loss compensation control section 33. The switching loss compensation control section 33 of this embodiment then calculates the equivalent resistance R corresponding to the power loss caused by the switching operation, based on the applied voltage Vpig and the phase current values Im and Il of the two phases other than the electric current undetectable phase among the phase current values Ix (X=U, V, and W).

Figure 11:
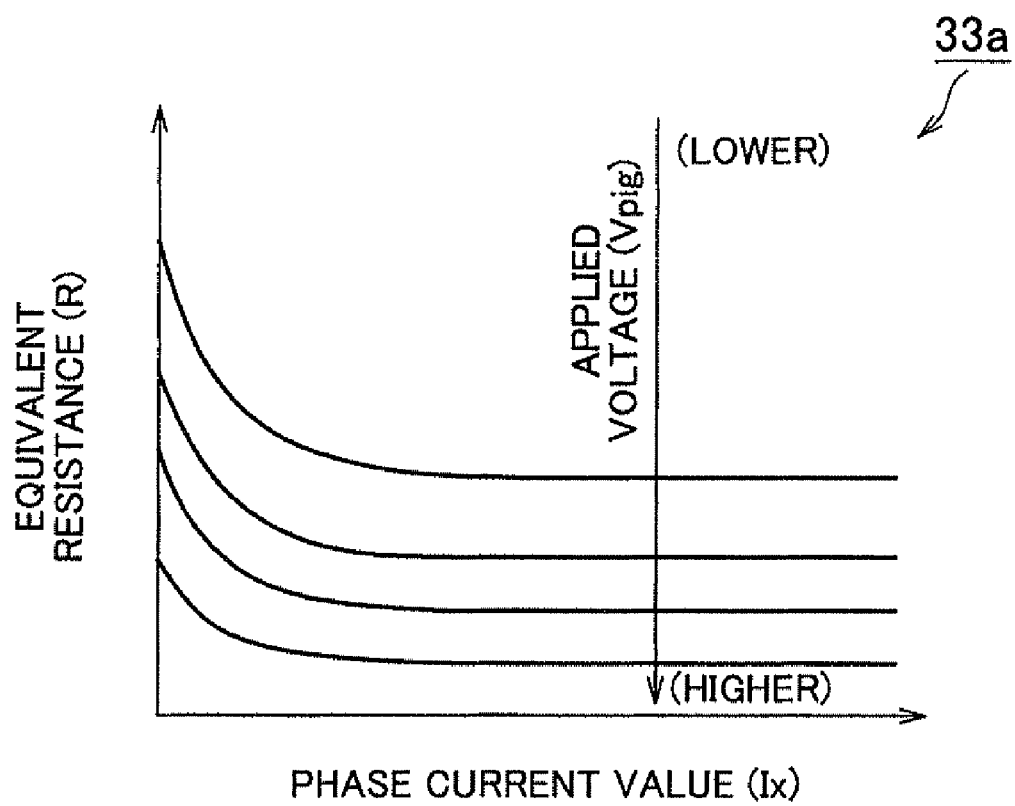
FIG. 11 is a schematic diagram of a map used to calculate an equivalent resistance.

Specifically, the switching loss compensation control section 33 is provided with a map 33a, in which the equivalent resistance R, and the phase current value Ix and the applied voltage Vpig are associated with each other as shown in FIG. 11. The map 33a is created by storing data into a storage region (memory), which data is obtained by experiments, simulations, etc.

In the map 33a, the equivalent resistance R is set so that the more the applied voltage Vpig increases, the lower the equivalent resistance R becomes. With regard to the relation between the equivalent resistance R and the phase current value Ix, the equivalent resistance R is set so that the equivalent resistance R decreases as the phase current value Ix increases in the region, in which the phase current value Ix is relatively small, and then the equivalent resistance R becomes substantially constant.

The switching loss compensation control section 33 calculates the equivalent resistances Rm and Rl corresponding to the power loss caused by the switching operation, which occur in the two phases other than the electric current undetectable phase, by referring to the thus created map 33a with the inputs of the detected applied voltage Vpig and the phase current values Im and Il of the phases other than the electric current undetectable phase. The voltage drop values $\epsilon$m and $\epsilon$l attributable to the power loss caused by the switching operation are calculated based on the equivalent resistances Rm and Rl and the corresponding phase current values Im and Il, and the correction values $\Delta$Dm and $\Delta$Dl corresponding to the voltage drop values $\epsilon$m and $\epsilon$l are respectively added to the DUTY command values Dm and Dl of the two phases other than the electric current undetectable phase, whereby the switching loss compensation control is performed.

Figure 12:
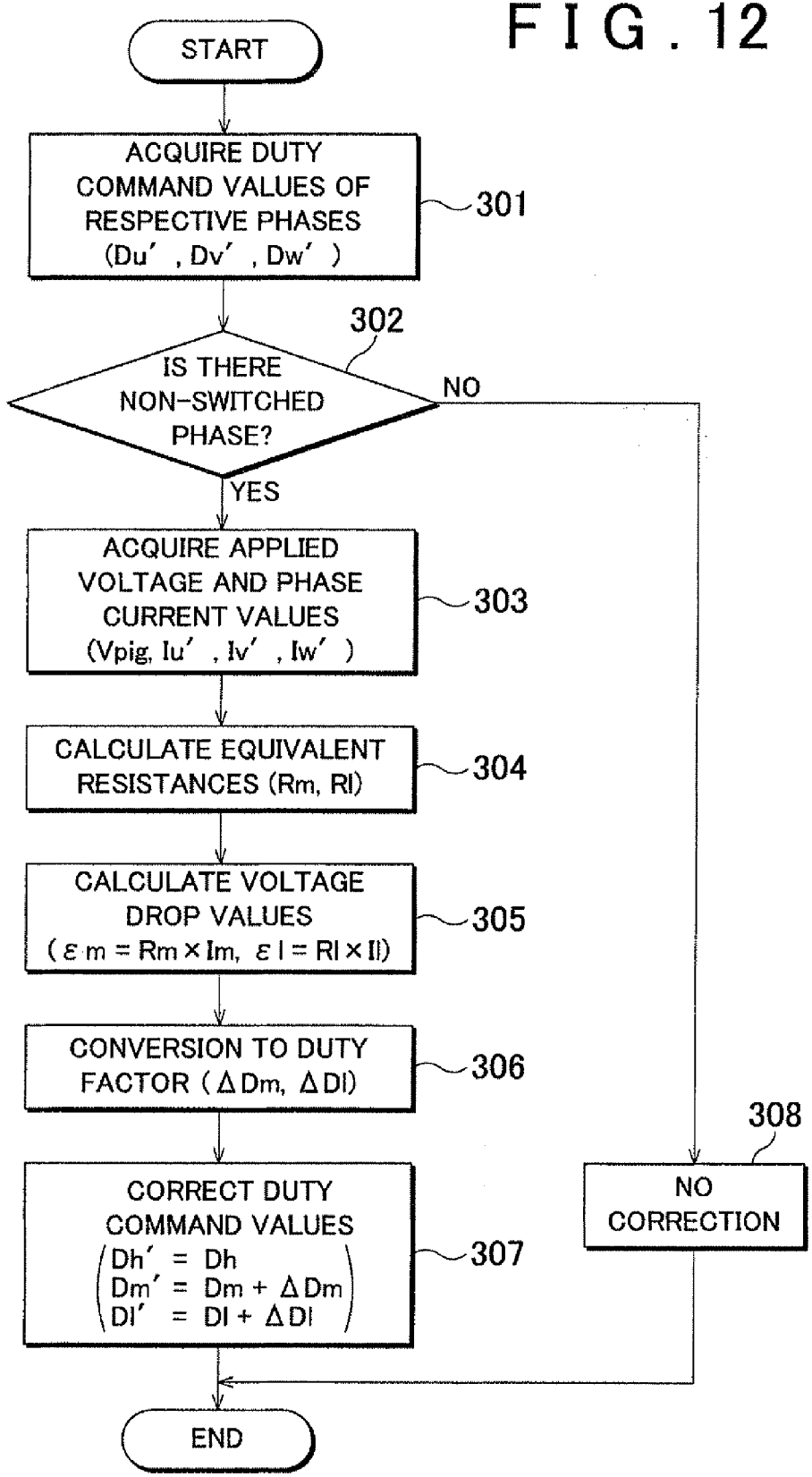
FIG. 12 is a flow chart showing a procedure of switching loss compensation control.

Next, a procedure of the switching loss compensation control performed by the switching loss compensation control section of this embodiment will be described. As shown by the flow chart shown in FIG. 12, when the switching loss compensation control section 33 acquires the DUTY command values Du', Dv', and Dw' of the respective phases output from the electric current detection compensation control section 32 (step 301), the switching loss compensation control section 33 determines whether the electric current detection compensation control is performed and a non-switched phase is therefore occurring, in which switching is not performed (step 302). The determination as to whether there is the non-switched phase is made based on whether the DUTY command value Dh that is the highest value is the value (Dh=100) that indicates that the switching state of the switching arm of the relevant phase should be maintained.

Next, when it is determined in step 302 that the non-switched phase is occurring (YES in step 302), the switching loss compensation control section 33 acquires the applied voltage Vpig applied to the drive circuit 18 (FETs 18a to 18f) and the phase current values Id, Iv', and Iw' of the respective phases (step 303). Subsequently, equivalent resistances Rm and Rl corresponding to the power loss caused by the switching operation that occurs in the two phases other than the electric current undetectable phase are calculated (step 304) and the voltage drop values $\epsilon$m and $\epsilon$l attributable to the power loss caused by the switching operation are calculated based on the equivalent resistances Rm and Rl and the corresponding phase current values Im and Il ($\epsilon$m=Rm×Im, $\epsilon$l=Rl×Il, step 305). Then, the correction values $\Delta$Dm and $\Delta$Dl are calculated by converting the voltage drop values $\epsilon$m and $\epsilon$l into the DUTYs (%) (step 306). Then, the correction values $\Delta$Dm and $\Delta$Dl are added to the DUTY command values Dm and Dl of the two phases other than the electric current undetectable phase, whereby the correction by the amount corresponding to the voltage drop due to the power loss caused by the switching operation is made (step 307). Note that the DUTY command value Dh of the electric current undetectable phase, which is the non-switched phase, is not corrected (Dh'=Dh, Dm'=Dm+$\Delta$Dm, Dl'=Dl+$\Delta$Dl).

The switching loss compensation control section 33 is configured to output the corrected DUTY command values Du', Dv', and Dw' to the PWM output section 30. When it is determined in step 302 that the non-switched phase is not occurring (NO in step 302), that is, when electric current detection and the electric current detection compensation control performed in the blind estimation are not performed, the switching loss compensation control section 33 does not perform the process of steps 303 to 307 and therefore, does not correct the DUTY command values Du', Dv', and Dw' (step 308).

According to this embodiment, the operations and effects as follows can be achieved.

(1) When the on time t0 of any one of the FETs 18d, 18e, and 18f on the lower potential side corresponding to the respective phases in the drive circuit 18 becomes shorter than the detection time is for detecting the phase current value, the microcomputer 17 estimates the phase current value of the electric current undetectable phase based on the phase current values of the two phases other than the electric current undetectable phase corresponding to the relevant FET (blind estimation). When the electric current detection is performed in the blind estimation, the motor control signals, by which the switching state of the switching arm of the electric current undetectable phase is maintained and the power loss caused by the switching operation of the FETs in the two phases other than the electric current undetectable phase is compensated for, are output.

According to the above configuration, even when an electric current undetectable phase occurs, in which the electric current cannot be detected by the electric current sensors 21u, 21v, and 21w provided on the lower potential side of the switching arms 18u, 18v, and 18w constituting the drive circuit 18, it is possible to detect the phase current values of all the three phases. In addition, when the phase current values of the two phases other than the electric current undetectable phase are detected, the switching state of the switching arm of the electric current undetectable phase is maintained, that is, switching operation thereof is not performed, so that it is possible to prevent the inclusion of the noise caused by the switching operation. As a result, it is ensured that the electric current is detected with high accuracy and at the same time, it is possible to improve the voltage utilization factor with the use of the higher DUTY command values Du, Dv, and Dw, without the need to set the limit to secure the detection time is for detecting the phase current values of all the three phases.

By compensating for the power loss caused by the switching operation of the FETs in the two phases other than the electric current undetectable phase, the balance between the electric current detectable phases and the electric current undetectable phase, in which the power loss caused by the switching operation does not occur, is maintained. As a result, it is possible to suppress the occurrence of the distortion in the waveforms of the interphase voltages between the electric current undetectable phase and the two phases other than the electric current undetectable phase, and to suppress the occurrence of the torque ripple caused by such a distortion, so that it is possible to ensure smooth rotation of the motor.

By limiting the timing of performing the switching loss compensation control to the time period, during which the electric current is detected in the blind estimation, and by inhibiting the performance of the compensation calculation in the electric current undetectable phase, which is the non-switched phase, it is possible to significantly suppress the increase in the calculation load. As a result, it is possible to avoid the increase in the throughput required of the microcomputer 17 and the accompanying increase in costs.

(2) The motor control signal output section 24 of the microcomputer 17 raises all the DUTY command values Du, Dv, and Dw to the higher potential side so that when the electric current is detected in the blind estimation, the electric current undetectable phase becomes the non-switched phase. Then, the correction values ΔDm and ΔDl corresponding to the voltage drop values ϵm and ϵl attributable to the power loss caused by the switching operation are calculated for the two phases other than the electric current undetectable phase and are respectively added to the DUTY command values Dm and Dl of the two phases other than the electric current undetectable phase.

According to the above configuration, it is possible to maintain the interphase voltage waveforms in a certain sinusoidal waveform and to make the electric current undetectable phase the non-switched phase. In addition, it is possible to compensate for the voltage drop due to the power loss caused by the switching operation for the two phases other than the electric current undetectable phase to suppress the occurrence of the distortion of the waveforms of the interphase voltages between the electric current undetectable phase and the two phases other than the electric current undetectable phase. As a result, it becomes possible to improve the voltage utilization factor while ensuring smooth rotation of the motor and the electric current detection with high accuracy.

(3) The switching loss compensation control section 33 provided in the motor control signal output section 24 calculates the equivalent resistance R corresponding to the power loss caused by the switching operation, based on the phase current values Im and Il of the two phases other than the electric current undetectable phase and the applied voltage Vpig. The voltage drop values ϵm and ϵl attributable to the power loss caused by the switching operation are then calculated based on the equivalent resistances Rm and Rl and the phase current values Im and Il of the two phases other than the electric current undetectable phase. The calculated voltage drop values ϵm and ϵl are converted into the DUTYs (%), whereby the correction values ΔDm and ΔDl are calculated.

According to the above configuration, it is possible to compensate for the voltage drop due to the power loss caused by the switching operation in the two phases other than the electric current undetectable phase. As a result, it is possible to ensure more smooth rotation of the motor.

The above embodiment may be modified as follows.

In the above embodiment, the invention is embodied in the form of the ECU 11, which functions as the motor controller that controls the operation of the motor 12, which functions as the drive power source of the EPS actuator 10. However, the invention is not limited to this and may be used in another application than the EPS.

The type of EPS is not limited to the column-assisted type but may be a pinion-assisted type or a rack-assisted type.

In the above embodiment, the microcomputer 17 outputs the motor control signals so that the waveform of the output voltage of the drive circuit 18 becomes a pseudo third harmonic-superimposed sinusoidal waveform. However, the invention is not limited to the case of the energization with such a pseudo third harmonic-superimposed sinusoidal wave but may be configured to energize a motor with the signals with the ordinary sinusoidal waveform or the signals with a third harmonic-superimposed sinusoidal waveform.

In the above embodiment, based on the DUTY command values Du, Dv, and Dw calculated in the course of generating the motor control signals, the occurrence of the electric current undetectable phase is determined (see FIGS. 5 and 6, steps 101 and 201) and the electric current detection compensation control for maintaining the switching state of the switching arm of the electric current undetectable phase is performed (see FIG. 6, step 203). However, the invention is not limited to this but may be configured to perform the determination as to the occurrence of the electric current undetectable phase and the electric current detection compensation control, based on the result of comparison between the timing of the electric current sampling that is performed in a predetermined cycle and the timing of turning on and off of the switching arms of the respective phases. Specifically, when the timing at which any one of the FETs 18a, 18b, and 18e on the higher potential side constituting the drive circuit 18 is turned off coincides with the timing (+margin), at which the sampling of the electric current is started, the switching state of the switching arm of the relevant phase may be maintained, for example.

In the above embodiment, the equivalent resistance R corresponding to the power loss caused by the switching operation is calculated by performing calculation with a map based on the phase current values Im and Il of the two phases other than the electric current undetectable phase and the applied voltage Vpig. However, the invention is not limited to this. The equivalent resistance R may be calculated based on any one of the phase current values and the applied voltage. Further, a configuration may be employed, in which a fixed value is used as the equivalent resistance R. With this configuration, it is possible to further reduce the calculation load.

In the above embodiment, the switching loss compensation control is performed by calculating the correction values ΔDm and ΔDl corresponding to the voltage drop values εm and εl and adding the correction values ΔDm and ΔDl to the DUTY command values Dm and Dl of the two phases other than the electric current undetectable phase. However, the invention is not limited to this but may be configured to perform the switching loss compensation control by adding the voltage drop values attributable to the power loss caused by the switching operation to the phase current command values of the two phases other than the electric current undetectable phase.

Next, the technical idea grasped from the above embodiment will be described with the effects of the invention. The motor controller is characterized in that the control signal output device uses a fixed value as the equivalent resistance. This further reduces the calculation load.

What is claimed is:

1. A motor controller comprising:
   a control signal output device that outputs a motor control signal; and
   a drive circuit that outputs three-phase electric power for drive based on the motor control signal, wherein
   the drive circuit includes switching arms, in each of which a pair of switching devices each turned on and off according to the motor control signal are connected in series, the switching arms being connected to each other in parallel, corresponding to respective phases,
   the switching arms have, on a lower potential side thereof, electric current sensors that detect phase current values of the respective phases corresponding to the respective switching arms, and
   the control signal output device generates the motor control signal by performing electric current feedback control based on phase current values of the respective phases that are detected at a timing at which all the switching devices on the lower potential side in the switching arms are turned on, wherein,
   when an on time of any one of the switching devices on the lower potential side becomes shorter than a detection time required to detect the electric current value, the control signal output device performs the electric current feedback control by estimating the phase current value of an electric current undetectable phase based on the phase current values of the two phases other than the electric current undetectable phase, wherein,
   when the control signal output device estimates the phase current value of the electric current undetectable phase based on the phase current values of the two phases other than the electric current undetectable phase, the control signal output device outputs the motor control signal, by which a switching state of the switching arm of the electric current undetectable phase is maintained and the power loss caused by a switching operation of the switching devices in the two phases other than the electric current undetectable phase is compensated for.

2. The motor controller according to claim 1, wherein
   the control signal output device calculates voltage command values of the respective phases by performing the electric current feedback control based on the detected phase current values of the respective phases and generates the motor control signal based on DUTY command values corresponding to the voltage command values, wherein,
   when the control signal output device estimates the phase current value of the electric current undetectable phase based on the phase current values of the two phases other than the electric current undetectable phase, the control signal output device raises the DUTY command values of the respective phases to a higher potential side so that the DUTY command value of the electric current undetectable phase becomes a value such that the switching device of the electric current undetectable phase on the higher potential side is maintained in an on state to maintain the switching state of the switching arm of the electric current undetectable phase, and, in order to compensate for a power loss caused by the switching operation of the switching devices in the two phases other than the electric current undetectable phase, the control signal output device calculates an equivalent resistance corresponding to the power loss and voltage drop values of the two phases based on the phase current values of the two phases other than the electric current undetectable phase and adds correction values corresponding to the voltage drop values to the DUTY command values of the two phases other than the electric current undetectable phase.

3. The motor controller according to claim 2, wherein
   the control signal output device detects an applied voltage applied to the drive circuit and calculates the equivalent resistance corresponding to the power loss in the two phases other than the electric current undetectable phase based on the applied voltage and the phase current values.

4. An electric power steering system comprising the motor controller according to claim 3.

5. An electric power steering system comprising the motor controller according to claim 2.

6. An electric power steering system comprising the motor controller according to claim 1.

* * * * *